United States Patent [19]

Sakurai

[11] Patent Number: 4,991,935
[45] Date of Patent: Feb. 12, 1991

[54] MAGNIFYING DEVICE FOR HAND-HELD VIDEO DISPLAY APPARATUS AND THE LIKE

[75] Inventor: Jun Sakurai, Ashiya, Japan

[73] Assignee: Konami Industry Co., Ltd., Japan

[21] Appl. No.: 435,700

[22] Filed: Nov. 13, 1989

[51] Int. Cl.⁵ .......................... G02B 27/02; A47G 1/16
[52] U.S. Cl. .................................... 350/239; 350/114; 40/362; 248/917
[58] Field of Search ................... 350/239–257, 350/319; 358/231–254, 906; 248/917–924; 362/294; 250/560; 354/74–78; 40/362–371; 355/71–73, 18, 60; 273/148 R, 148 A, 148 B

[56] References Cited

U.S. PATENT DOCUMENTS

| | | | |
|---|---|---|---|
| 2,716,918 | 9/1855 | Miles | 350/239 |
| 3,389,636 | 6/1968 | Weitzner et al. | 350/145 |
| 3,748,765 | 7/1973 | Bass et al. | 40/367 |
| 3,804,504 | 4/1974 | Scott | 358/254 |
| 4,030,814 | 6/1977 | Clifton et al. | 350/239 |
| 4,076,391 | 2/1978 | Teiser et al. | 350/241 |
| 4,099,851 | 7/1978 | Rethore | 350/246 |
| 4,250,644 | 2/1981 | Jantzen | 40/362 |
| 4,549,785 | 10/1985 | Vitrac | 350/250 |
| 4,550,515 | 11/1985 | Simmons | 40/362 |

OTHER PUBLICATIONS

"Toys" Intern and the Retailer, 5/84, pp. 20–21.

*Primary Examiner*—Bruce Y. Arnold
*Assistant Examiner*—Thong Nguyen
*Attorney, Agent, or Firm*—Welsh & Katz, Ltd.

[57] ABSTRACT

A magnifying device for use with a hand-held video display apparatus or the like having a generally rectangular housing and a video display visually observable from externally of the housing. The magnifying device includes a frame adapted for releasable mounting on the video display housing, and has a magnifying lens adapted to overlie the video display and effect magnification of the video display during operation when the magnifying device is mounted on the video display apparatus.

13 Claims, 1 Drawing Sheet

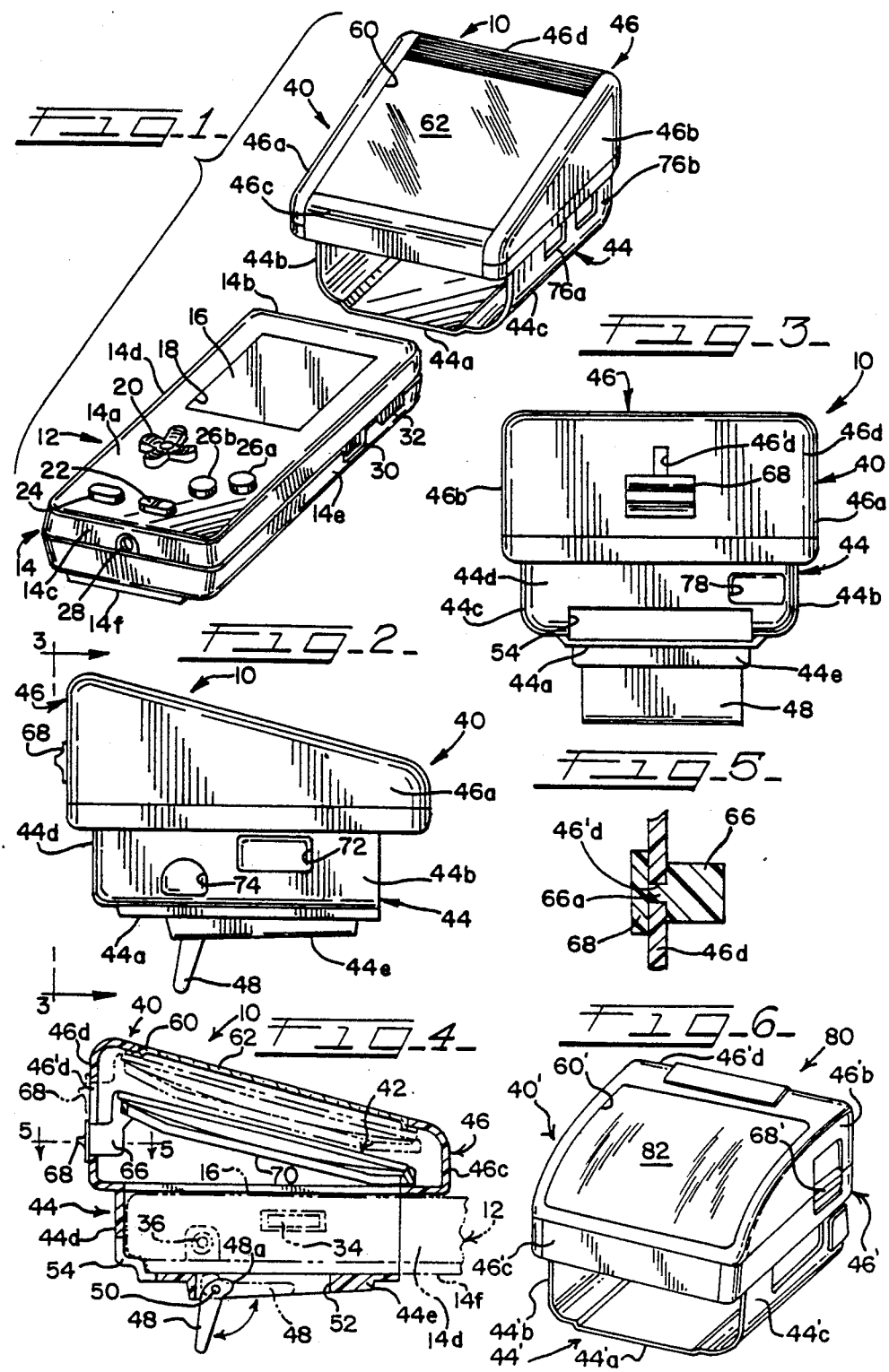

MAGNIFYING DEVICE FOR HAND-HELD VIDEO DISPLAY APPARATUS AND THE LIKE

BACKGROUND OF THE INVENTION

The present invention relates generally to magnifying devices, and more particularly to a magnifying device which may be mounted on a hand-held video display apparatus or the like for magnifying the video display.

The advent of video display apparatus, such as calculators and video games, has led to the development of compact hand-held models or versions which generally include a rectangular housing adapted to be held in a hand of the user. The housing conventionally supports a video display exposed through an upper surface of the housing. Control levers, buttons and/or knobs are generally supported by the housing at convenient locations so as to enable an operator to readily manipulate the various controls with one hand while holding the video display housing in the other hand. A drawback to many hand-held video display apparatus of known design is that the video display, which may comprise an LCD screen, presents the displayed characters or scenes in relatively small scale so as to make it difficult for some persons to readily decipher the displayed characters or images. In such cases, a device adapted for cooperation with the hand-held video apparatus and operative to enhance recognition of the video display by magnification would greatly improve the usability of such video display apparatus by persons who otherwise would have difficulty recognizing the displayed characters or images.

SUMMARY OF THE INVENTION

One of the primary objects of the present invention is to provide a novel magnifying device particularly adapted for use with a hand-held video display apparatus to magnify the video display of the apparatus.

A more particular object of the present invention is to provide a novel magnifying device for use with a hand-held video display apparatus and which may be readily releasably mounted on the video display apparatus housing such that a magnifying lens carried by the magnifying device overlies the video display.

A feature of the magnifying device in accordance with the present invention lies in supporting the magnifying lens in a manner to enable adjustment of the magnifying lens relative to the video display when the magnifying device is mounted on the video display apparatus.

Another feature of the magnifying device in accordance with the present invention lies in the provision of openings in the magnifying device frame or housing to enable manipulation of various controls on an underlying video display apparatus when the magnifying device is mounted thereon.

Another feature of the magnifying device in accordance with the present invention lies in the provision of latch means which enables releasable locking of the magnifying device on a hand-held video display apparatus.

Further objects, features and advantages of the invention will become apparent from the following detailed description when taken in conjunction with the accompanying drawing wherein like reference numerals designate like elements throughout the several views.

BRIEF DESCRIPTION OF THE DRAWING

FIG. 1 is a perspective view illustrating one embodiment of a magnifying device in accordance with the present invention positioned to be mounted onto a hand-held video display apparatus;

FIG. 2 is side elevational view of the magnifying device of FIG. 1;

FIG. 3 is an end view of the magnifying device of FIG. 2, taken along line 3—3 of FIG. 2;

FIG. 4 is a longitudinal sectional view, on an enlarged scale, of the magnifying device of FIG. 1 mounted on a hand-held video display apparatus fragmentarily illustrated in phantom;

FIG. 5 is a fragmentary detail view, on an enlarged scale, taken substantially along line 5—5 of FIG. 4; and FIG. 6 is a perspective view of an alternative embodiment of a magnifying device in accordance with the present invention.

DETAILED DESCRIPTION

Referring now to the drawing, and in particular to FIGS. 1-4, a magnifying device constructed in accordance with one embodiment of the present invention is indicated generally at 10. The magnifying device 10 is adapted for cooperative relation with a hand-held video display apparatus, such as indicated generally at 12 in FIG. 1, so as to magnify the characters or images created on the video display during operation of the video apparatus.

The hand-held video display apparatus 12 is of conventional design and includes a generally rectangular housing 14 of a size enabling it to be held in the operator's hand while manipulating various controls, as on a hand-held calculator or video game apparatus. The rectangular housing 14 has a longitudinal axis extending along the major dimension of the housing, and a minor axis transverse to the longitudinal axis. In the illustrated embodiment, the video display apparatus 12 represents a hand-holdable video game apparatus having a generally rectangular video display 16, such as a conventional LCD screen, visible through a rectangular opening 18 formed in an upper surface 14a of housing 14. A control 20 of generally cross or X-shape is supported by the housing 14 so as to extend above the upper surface 14a and has arms extending generally in the direction of X and Y coordinates in the plane of the upper surface 14a. The control 20 enables operator controlled movement of a character or image on the video display along right-angle X and Y coordinates within the video display, as viewed generally normal to the video display.

A "start" mode control knob or button 22 and a "select" mode knob or button 24 extend above the housing surface 14a to enable starting of a game mode and response to instructions displayed on the video display 16 under the control of a game format programmed on a ROM loaded within an end 14b of the video display apparatus housing. Other control knobs or buttons, such as indicated at 26a and 26b, may extend upwardly from the housing surface 14a for controlling other operating characteristics of the video display apparatus. Additional operating controls and accessory connector sites are provided along the laterally opposite sides 14c and 14d and on the ends 14b and 14c of the housing 14, such as an earphone jack 28 in end surface 14c and a volume control 30 and external connector site 32 in side 14e, as illustrated in FIG. 1.

A video display contrast control 34 and an auxiliary power supply port 36 may be provided in the side 14d of housing 14, as illustrated in phantom in FIG. 4. A power control on/off switch may be provided on either side wall of the housing 14 or on the rear end 14b. Video display game apparatus of the type thus far described are commercially available and are illustrative of only one type of video display apparatus with which the present invention finds application.

Turning now to the magnifying device 10, and referring to FIGS. 1-4, the magnifying device includes frame means, indicated generally at 40, adapted for releasable mounting on the video display apparatus housing 14. Briefly, the frame means 40, which may alternatively be termed housing means, supports a rectangular magnifying lens 42 (FIG. 4) which is adapted to overlie the video display 16 when the magnifying device is mounted on housing 14. As will be more fully described, the magnifying lens 42 is operative to magnify the characters and images produced on the video display 16 when viewed through the magnifying lens during operation of the video display apparatus.

The frame or housing means 40 may be formed of a rigid lightweight plastic material, or other suitable material, and has a lower portion 44 defined by a generally planar lower wall 44a and parallel laterally opposite upstanding sidewalls 44b and 44c. Frame means 40 has an upper portion 46 which is generally rectangular in plan configuration and is affixed to the upper marginal edges of the lower sidewalls 44b and 44c, such as being formed integral therewith in the case of a molded plastic frame or housing means. In the embodiment illustrated in FIGS. 1-4, the lower frame portion 44 cooperates with the upper frame portion 46 to define a channel or recess of transverse cross-sectional configuration similar to the external transverse cross-sectional configuration of the video display housing 14 and having an open forward end to enable the magnifying device to be slid over the rear end of housing 14 in generally telescoping sliding relation, as illustrated in FIG. 4. The lower frame portion 44 of the magnifying device has an upstanding transverse rear wall 44d which serves to abut the rear end surface 14b of the video display housing 14 and establish the desired position of the magnifying device relative to the video display 16 when mounted on the video display apparatus.

To facilitate releasable locking of the magnifying device 10 on the video display apparatus 12, latch means in the form of a latch lever 48 is pivotally mounted on the lower portion 44 of frame means 40 for pivotal movement between a non-latching position, as illustrated in solid lines in FIG. 4, and a latching position wherein a cam surface 48a on the latch lever frictionally engages a lower surface 14f on the video display housing 14, as illustrated in phantom in FIG. 4. The latch lever 48 is pivotally supported on a transverse pivot shaft 50 which has its opposite ends affixed within a depending boss 44e formed on the lower frame portion 44. The latch lever 48 is supported within a rectangular recess 52 in the boss 44e and is configured so that when the latch lever is moved through an over-center position from its non-latched to its latched condition, the latch lever is fully disposed within recess 52 and cam surface 48a is cammed into frictional engagement with the video display housing 14 to releasably lock the magnifying device in assembled relation on the video display housing. Release of the latch lever 48 through outward pivotal movement enables removal of the magnifying device. The rear end wall 44d of the lower frame portion 44 has a rectangular recess or opening 54 which defines an access opening through which modular ROMs may be inserted into and retracted from a ROM receiving chamber formed in the end 14b of the video display housing 14 without removing the magnifying device.

The upper portion 46 of the frame means 40 has upstanding sidewalls 46a and 46b interconnected at their forward marginal edges by a transverse curved front end wall 46c. Rear marginal edges of the sidewalls 46a, b are interconnected through a rear end wall 46d. In the embodiment of FIGS. 1-4, the upper marginal edges of the sidewalls 46a and 46b lie in a common plane inclined upwardly from the forward transverse wall 46c toward the rear transverse wall 46b, such as at an angle of inclination forming an included angle of approximately fifteen degrees with the upper marginal edges of the sidewalls 44a, b. The upper marginal edges of the sidewalls 46a and 46b cooperate with upper marginal edges of the forward and rear transverse walls 46c and 46d, respectively, to define a rectangular opening 60 within which is supported a planar clear transparent protective cover or window 62 which may comprise a nonbreakable clear plastic.

With the magnifying device 10 as thus far described mounted on a video display apparatus, such as the illustrated video game 12, the transparent window 62 overlies the video display 16, and the rectangular magnifying lens 42 is interposed between window 62 and the underlying video display. To enable selective adjustment of the magnifying lens 42 so as to provide a clear magnified image of the characters and images displayed on the video display 16 for persons with different vision characteristics, the magnifying lens is supported within the upper portion 46 of the magnifying device on adjustable support means. Referring to FIGS. 4 and 5, the magnifying lens support means includes an adjustable support bracket 66 which has a narrow neck portion 66a extending through a vertical elongated slot 46'd in the rear wall 46d of the upper frame portion 46. A thumb or finger knob 68 is suitably affixed to the outer end of neck portion 66a of the support bracket to enable selective adjustment of the support bracket along the length of the elongated slot 46'd. The support bracket 66 includes a generally rectangular frame, one leg of which is illustrated at 70 in FIG. 4, which cradles and supports the magnifying lens 42 and maintains it in parallel relation to the transparent window 62.

In operation, the magnifying device 10 is mounted on a video display apparatus by sliding the frame or housing means 40 over the end of the video display apparatus so that the magnifying lens 42 and transparent window 62 overlie the video display 16. The latch 48 may then be moved to a latching position releasably locking the magnifying device on the video display apparatus. The sidewalls 44b and 44c and the end wall 44d of the lower frame portion 44 have openings which enable access to functional controls and accessory attachment sites on the video display housing 14. For example, the sidewall 44b has a pair of openings 72 and 74 which enable access to the contrast control knob 34 and power connector site 36 on the sidewall 14 of housing 14. The opposite sidewall 44c of the magnifying device has a pair of rectangular openings 76a and 76b which facilitate access to the volume control knob 30 and external connector site 32, respectively, on the sidewall 14e of housing 14. A rectangular opening 78 is formed in the rear transverse wall 44d of the magnifying device to facilitate access to a power on-off switch (not shown) on the end wall 14b of housing 14.

With the magnifying device 10 thus mounted on a video display apparatus, an operator may readily hold the video display apparatus and associated magnifying device in one hand while manipulating the various controls on the video display apparatus with his/her free hand. The display screen 16 may be readily observed through the transparent window 62 and magnifying lens 42, with the magnifying lens being adjustable through the control knob 68 to establish clear magnified images of the video display 16, thus significantly enhancing the ability to decipher the characters or images displayed on video display 16.

FIG. 6 illustrates an alternative embodiment of a magnifying device, indicated generally at 80, which is substantially similar to the aforedescribed magnifying device 10 and has its various structural components indicated by similar but primed reference numerals. The magnifying device 80 differs from the magnifying device 10 in that its upper surface has an outwardly projecting convex curvature as represented by a convexly curved transparent window or protective cover 82. A rectangular magnifying lens (not shown) substantially identical to the magnifying lens 42 is supported within the upper portion 46' of the frame means 40' and is adjustable relative to the transparent window 82 by means of an adjustable support frame and associated control knob 68' mounted on the sidewall 46'b of the frame means 40'. In other respects, the magnifying device 80 is substantially identical to the magnifying device 10 and operates in similar fashion.

While preferred embodiments of the magnifying device in accordance with the present invention have been illustrated and described, it will be understood that changes and modifications may be made therein without departing from the invention in its broader aspects. Various features of the invention are defined in the following claims.

What is claimed is:

1. A magnifying device for use with a hand-held video display apparatus which includes a housing and a video display supported by the housing so as to be visually observable from externally of the housing, said magnifying device comprising frame means adapted for releasable mounting on the housing, said device having a magnifying lens supported by said frame means to overlie the video display when said magnifying device is mounted on the housing, said magnifying lens being operative to effect magnification of said video display when viewed through said lens during operation of the video display apparatus.

2. A magnifying device as defined in claim 1 wherein the video display apparatus housing is generally rectangular in transverse cross-sectional configuration, said frame means being adapted for mounting on said housing in sliding relation therewith.

3. A magnifying device as defined in claim 2 wherein said frame means defines a recess adapted to receive the rectangular housing in telescoping relation therein.

4. A magnifying device as defined in claim 2 wherein said frames means defines a recess having a substantially rectangular transverse cross-section so as to facilitate sliding telescoping of said frame means on said housing.

5. A magnifying device as defined in claim 1 wherein said magnifying lens is supported by said frame means so as to lie in a plane inclined to the video display when the magnifying device is mounted on the display apparatus.

6. A magnifying device as defined in claim 1 including means supporting said magnifying lens on said frame means so as to enable adjustment of said magnifying lens relative to the video display when said frame means is mounted on the housing.

7. A magnifying device as defined in claim 1 wherein said video display apparatus has controls thereon manipulatable from externally of said housing to operate the video display apparatus, said frame means of said magnifying device having a plurality of openings adapted for selective registration with said manipulatable controls so as to enable manipulation of said controls when the magnifying device is mounted on the video display apparatus housing.

8. A magnifying device as defined in claim 1 including latch means operatively associated with said frame means to enable releasable locking of said frame means on the housing.

9. A magnifying device as defined in claim 8 wherein said latch means includes a latch lever supported by said frame means for selective over-center movement between non-latched and latched locking relation with the housing when the frame means is mounted thereon.

10. A magnifying device as defined in claim 9 wherein said frame means is recessed to fully receive said latch lever when in latched relation with the housing.

11. A magnifying device as defined in claim 1 including adjustable support means cooperative with said frame means and said magnifying lens to enable adjustment of said lens relative to said frame means.

12. A magnifying device as defined in claim 6 wherein said frame means has upper marginal edges defining an opening adapted to overlie the video display when said magnifying device is mounted on the housing, said lens supporting means including an adjustable support bracket supporting said lens in parallel relation to said upper marginal edges.

13. A magnifying device as defined in claim 12 wherein said upper marginal edges lie in a plane inclined to the longitudinal axis of the housing when the magnifying device is mounted thereon.

* * * * *

UNITED STATES PATENT AND TRADEMARK OFFICE
CERTIFICATE OF CORRECTION

PATENT NO.   :   4,991,935
DATED        :   February 12, 1991
INVENTOR(S)  :   Jun Sakurai It is certified that error appears in the above-identified patent and that said Letters Patent is hereby corrected as shown below:

Column 2, line 64,   "14c" should be --14d--.
Column 2, line 65,   "14d" should be --14e--.

Signed and Sealed this

Twenty-first Day of July, 1992

*Attest:*

DOUGLAS B. COMER

*Attesting Officer*   Acting Commissioner of Patents and Trademarks